United States Patent
Kong et al.

(10) Patent No.: US 10,771,991 B2
(45) Date of Patent: Sep. 8, 2020

(54) SYSTEM AND METHOD FOR TESTING END-TO-END PERFORMANCE OF USER EQUIPMENT COMMUNICATING WITH BASE STATIONS USING DYNAMIC BEAMFORMING

(71) Applicant: Keysight Technologies, Inc., Santa Rosa, CA (US)

(72) Inventors: Hong-Wei Kong, Beijing (CN); Song Yang, Beijing (CN)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 16/552,056

(22) Filed: Aug. 27, 2019

(65) Prior Publication Data

US 2020/0213883 A1   Jul. 2, 2020

(30) Foreign Application Priority Data

Dec. 26, 2018  (CN) .......................... 2018 1 1602123

(51) Int. Cl.
| | |
|---|---|
| *H04W 24/06* | (2009.01) |
| *H04B 17/00* | (2015.01) |
| *H04W 72/08* | (2009.01) |
| *H04B 17/391* | (2015.01) |
| *H04W 72/04* | (2009.01) |

(52) U.S. Cl.
CPC ........ *H04W 24/06* (2013.01); *H04B 17/0087* (2013.01); *H04B 17/3911* (2015.01); *H04W 72/048* (2013.01); *H04W 72/0453* (2013.01); *H04W 72/085* (2013.01)

(58) Field of Classification Search
CPC ............... H04W 24/06; H04W 72/048; H04W 72/0453; H04W 72/085; H04B 17/3911; H04B 17/0087; H04B 17/15
See application file for complete search history.

(56) References Cited

U.S. PATENT DOCUMENTS

| | | | | |
|---|---|---|---|---|
| 5,987,328 | A  * | 11/1999 | Ephremides ............ | G06F 17/50 455/446 |
| 6,128,589 | A  * | 10/2000 | Lilly ................... | G06F 17/5009 703/13 |
| 6,600,926 | B1 * | 7/2003 | Widell ............... | H04B 17/0087 455/446 |
| 6,934,555 | B2 * | 8/2005 | Silva ..................... | H04W 16/18 455/450 |

(Continued)

*Primary Examiner* — Julio R Perez

(57) ABSTRACT

A test system for testing an antenna of user equipment includes a channel emulator, an anechoic chamber, a base station emulator and a test control computer. The channel emulator supports bi-directional channel emulation and emulates wireless channel conditions with fading and without fading. The anechoic chamber is connected to the channel emulator and contains probes as well as user equipment as a device under test. The base station emulator is connected to the channel emulator and performs protocol testing with the device under test via the channel emulator without fading. The test control computer controls the other element of the test system along with a base station that is connected to the channel emulator and that performs performance testing with the device under test via the channel emulator with fading after the protocol testing is performed without fading.

10 Claims, 7 Drawing Sheets

(56) References Cited

U.S. PATENT DOCUMENTS

| | | |
|---|---|---|
| 9,859,995 B2 | 1/2018 | Kong et al. |
| 10,033,473 B1 * | 7/2018 | Kyrolainen .......... H04B 17/391 |
| 10,110,326 B1 * | 10/2018 | Kyrolainen ........ H04B 17/0087 |
| 2017/0373773 A1 | 12/2017 | Jing et al. |
| 2018/0034563 A1 * | 2/2018 | Foegelle ............ H04B 17/0087 |

* cited by examiner

SYSTEM AND METHOD FOR TESTING END-TO-END PERFORMANCE OF USER EQUIPMENT COMMUNICATING WITH BASE STATIONS USING DYNAMIC BEAMFORMING

CROSS REFERENCE TO RELATED APPLICATIONS

The present application claims priority under 35 U.S.C. § 119(e) to Chinese Patent Application No. 201811602123.7, filed on Dec. 26, 2018. The entire disclosure of Chinese Patent Application No. 201811602123.7 is hereby specifically incorporated by reference in its entirety.

BACKGROUND

Multiple-input multiple-output (MIMO) technology implemented at a large scale is a key to $5^{th}$ generation (5G) wireless networks. Using a so-called massive MIMO antenna, a 5G base station is able to form spatially separated narrow beams, each pointing to different user equipment (UE) such as wireless mobile devices at different respective locations. The massive MIMO antenna is a base station antenna with numerous antenna elements that can be dynamically grouped in subsets to each form and radiate a narrow beam. The narrow beam radiated from each different subset of antenna elements can be radiated directionally in a primary direction different from narrow beams radiated from other subsets of antenna elements. The massive MIMO antenna that simultaneously radiates narrow beams in different directions enlarges network capacity, improves spectrum efficiency, and enables simultaneous access by different user equipment in spatially diverse locations. However, to benefit from the massive MIMO antenna and spatially separated narrow beams, the base station and the user equipment should have a mechanism to find an optimized beam for communicating between the base station and the user equipment, and to control the beam to continuously track movement of the user equipment. The user equipment designed and optimized for 5G networks also needs to be tested for interoperability with the 5G base stations. Test solutions which can test end-to-end performance of the user equipment communicating with a 5G base station (i.e., using a massive MIMO antenna) are thus needed.

With the evolution of wireless communications technologies, user equipment increasingly has antennas that are directly connected to and integrated with radio frequency (RF) transceivers, and thus are increasingly provided with no RF connectors. Overall performance of such user equipment as a device under test (DUT) being tested by a testing system presently must be tested over-the-air (OTA) since there is no place (e.g., no RF connector) to connect a coaxial cable from the user equipment and/or the antenna to test equipment. In fact, due to antenna integration, overall user equipment performance is now typically tested as a function of the antenna configuration.

To characterize performance, various attributes of the user equipment, such as radiation profile, effective isotropic radiated power, total radiated power, error-vector-magnitude (EVM) of the modulation, and adjacent channel leakage ratios (ACLRs), for example, are characterized as a function of beam angle. This may involve a time-consuming process. For example, characterizing just the radiation profiles of the user equipment as a function of beam angle may take hours.

Conventional solutions for testing user equipment performance in wireless networks may suffer from a variety of shortcomings in communications with base stations using dynamic beamforming, such as in 5G networks. For example, one such conventional solution is a multiple probe anechoic chamber (MPAC) based MIMO OTA test system which includes a base station emulator. Anechoic chambers are shielded, including walls covered in absorbing material that minimizes internal reflections, typically by several tens of decibels. The MPAC-based MIMO OTA test system is designed to test the user equipment downlink MIMO OTA performance. However, the MPAC-based MIMO OTA test system does not provide for user equipment uplink spatial channel emulation. Additionally, the MPAC-based MIMO OTA test system does not include the 5G base station (i.e., with the massive MIMO antenna), due for example to the large number of channels used by the 5G base station. The MPAC-based MIMO OTA test system is also not designed to support channel emulation for the 5G base station described above. Insofar as a narrow beam will make a channel much more directional at the user equipment side, a ring of measurement probes in the MPAC may not even adequately support the bi-direction spatial channel emulation. Moreover, the base station emulator used in the MPAC-based MIMO OTA test system typically does not work with fading uplink channels. Therefore, an MPAC-based MIMO OTA test system is not particularly suitable for testing user equipment performance in 5G networks.

Another conventional testing solution for testing user equipment is the radiated two-stage (RTS) method. The RTS system is designed to test the user equipment downlink MIMO OTA performance but suffers from several of the same shortcomings as the MPAC-based MIMO OTA test system described above. For example, the RTS system does not include the user equipment uplink spatial channel emulation. Additionally, the RTS system does not include a base station that uses a massive MIMO antenna for end-to-end test. Moreover, the base station emulator used in the RTS system typically does not work with fading uplink channels.

Other conventional testing solutions do not test the user equipment antenna, or do not test radiation performance of the user equipment as the DUT at all. Even testing performance of the user equipment as the DUT in the field in a real network is not particularly suitable, insofar as testing in a real network may provide for overall network quality evaluation but does not provide for a controllable and repeatable test environment for testing performance of the user equipment and the user equipment antenna.

Therefore, a practical approach is needed for testing performance of the user equipment communicating with base stations using dynamic beamforming, such as in 5G networks.

BRIEF DESCRIPTION OF THE DRAWINGS

The illustrative embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements throughout the drawings and written description.

DETAILED DESCRIPTION

Figure 1A:
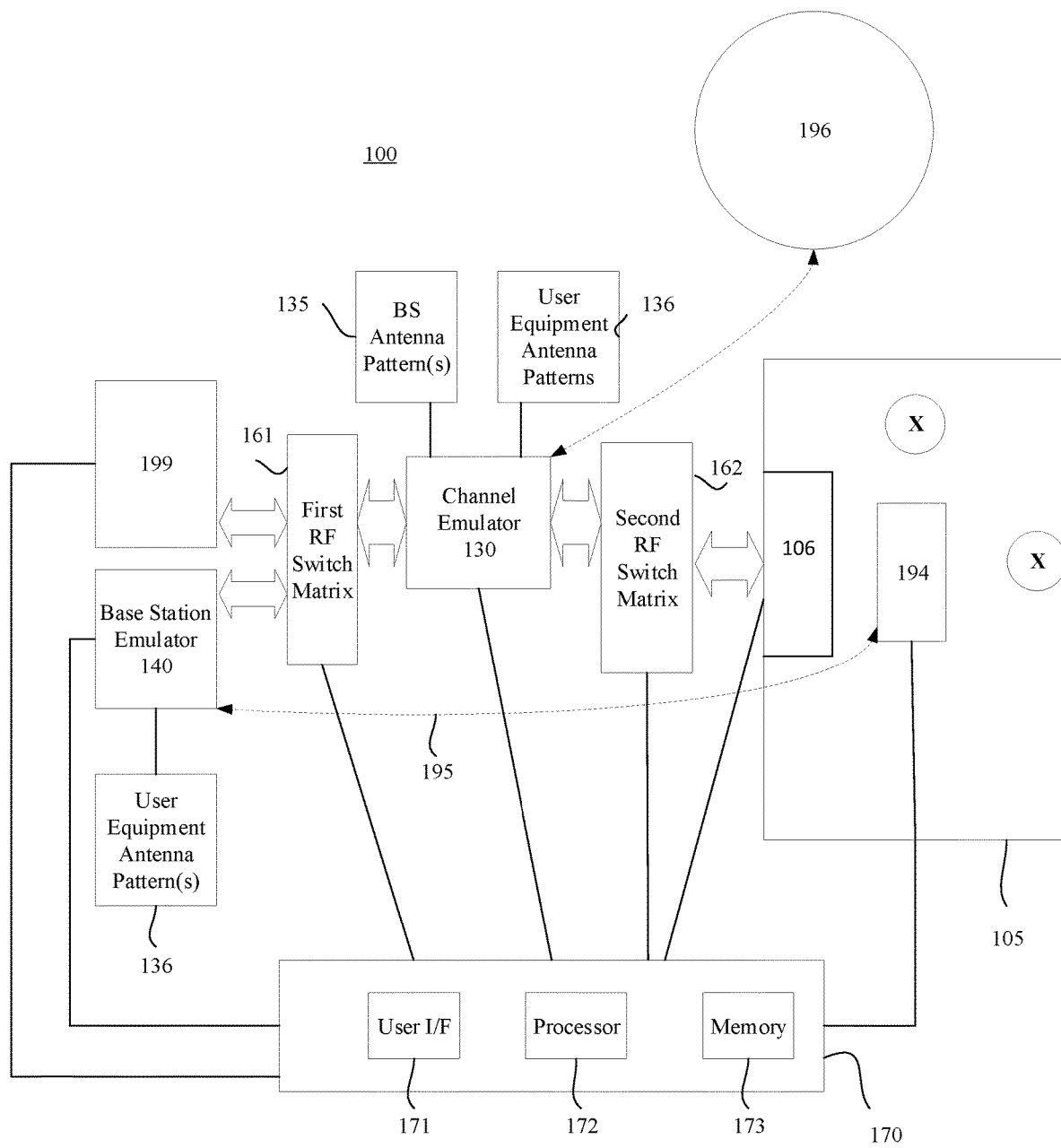
FIG. 1A is a simplified block diagram of a test system for performing OTA testing of user equipment within an anechoic chamber, according to representative embodiments.

In the following detailed description, for purposes of explanation and not limitation, example embodiments disclosing specific details are set forth in order to provide a thorough understanding of the present teachings. However, it will be apparent to one of ordinary skill in the art having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only and is not intended to be limiting. The defined terms are in addition to the technical, scientific, or ordinary meanings of the defined terms as commonly understood and accepted in the relevant context.

The terms "a", "an" and "the" include both singular and plural referents, unless the context clearly dictates otherwise. Thus, for example, "a device" includes one device and plural devices. The terms "substantial" or "substantially" mean to within acceptable limits or degree to one of ordinary skill in the art. The term "approximately" means to within an acceptable limit or amount to one of ordinary skill in the art. Relative terms, such as "above," "below," "top," "bottom," "upper" and "lower" may be used to describe the various elements" relationships to one another, as illustrated in the accompanying drawings. These relative terms are intended to encompass different orientations of the device and/or elements in addition to the orientation depicted in the drawings. For example, if the device were inverted with respect to the view in the drawings, an element described as "above" another element, for example, would now be below that element. Where a first device is said to be connected or coupled to a second device, this encompasses examples where one or more intermediate devices may be employed to connect the two devices to each other. In contrast, where a first device is said to be directly connected or directly coupled to a second device, this encompasses examples where the two devices are connected together without any intervening devices other than electrical connectors (e.g., wires, bonding materials, etc.).

According to various embodiments, OTA testing of user equipment is performed under dynamic beamforming using both a base station emulator and an actual base station. The base station enables OTA testing of end-to-end performance of user equipment under dynamic beamforming. In other embodiments, a base station emulator is provided to emulate the base station while working with fading uplink channels, such that end-to-end performance of user equipment under dynamic beamforming can be tested OTA without requiring the actual base station.

FIG. 1A is a simplified block diagram of a test system 100 for performing OTA testing of user equipment within an anechoic chamber, according to representative embodiments. Generally, the test system 100 in FIG. 1A is configured for testing end-to-end performance of user equipment 194 communicating with a base station 199 using dynamic beamforming.

Referring to FIG. 1A, test system 100 includes an anechoic chamber 105, a channel emulator 130, a base station emulator 140, and a test controller 170. The test system 100 shown in FIG. 1A also includes a first RF switch matrix 161 and a second RF switch matrix 162.

The anechoic chamber 105 houses user equipment 194 as a DUT. The anechoic chamber 105 may be a far-field chamber for the user equipment 194, though the anechoic chamber 105 may be smaller so long as the anechoic chamber 105 provides for accurate measurement of the antenna patterns of the user equipment 194. The anechoic chamber 105 also includes measurement probes 106. Accordingly, the anechoic chamber 105 contains individual measurement probes of the measurement probes 106 and the user equipment 194 as a DUT, though the anechoic chamber 105 may include other elements such as separate coupling probes.

The channel emulator 130 provides bi-directional channel emulation for communications between the user equipment 194 and the base station emulator 140 and for communications between the user equipment 194 and the base station 199. The channel emulator 130 is configured to emulate wireless channel conditions with fading and without fading in channels of the channel emulator. For example, the channel emulator 130 is configured to provide bi-directional channel models of channels between the user equipment 194 and the base station 199 or base station emulator 140, by jointly emulating antenna patterns and channels. Processes described herein for some embodiments include deactivating fading in the channel emulator 130 when the base station emulator 140 is connected and activating fading in the channel emulator 130 when the base station 199 is connected.

The channel emulator 130 emulates antenna patterns of the user equipment 194, to emulate both transmitter antenna effects and receive antenna effects. In the embodiment of FIG. 1A, all spatial channel emulation performed by the test system 100 may be performed inside the channel emulator 130, rather than with both the channel emulator 130 and the anechoic chamber 105 as in the MPAC-based MIMO OTA test system described above.

The channel emulator 130 may store and execute software blocks to implement programming functions. For example, the channel emulator 130 may include an inversion matrix block, a channel emulation block, and a beam test block, all of which will be explained below. It is understood that, in an embodiment, the channel emulator 130 may be a processing device or multiple processing devices programmed to implement the functions described herein by executing instructions of a software program or software modules. For example, the channel emulator 130 may be implemented using one or more processors, such as a computer processor, application specific integrated circuits (ASICs), field-programmable gate arrays (FPGAs), or combinations thereof, using software, firmware, hard-wired logic circuits, or combinations thereof. A computer processor may be constructed of any combination of hardware, firmware and/or software architectures, and may include its own memory (e.g., non-volatile memory) that stores executable software/firmware executable code of instructions that allows it to perform the various functions. In an embodiment, the computer processor may include a central processing unit (CPU), for example, executing an operating system. Also, in an embodiment, the functionality of the channel emulator 130 may be implemented as a computer program or computer software and/or instructions executable by a separate computing device, such as a computer work station or a personal computer (PC), without departing from the scope of the present teachings.

The base station emulator 140 is variably connected to the channel emulator 130. The base station emulator 140 is used during protocol testing to measure the antenna patterns of the user equipment 194 as well as a radiation channel matrix H between the measurement probes 106 and the antennas of the user equipment 194. That is, the base station emulator 140 measures the antenna patterns of the device under test as measured antenna patterns of the device under test along with the radiation channel matrix H between the measurement probes 106 and the antennas of the user equipment 194. A testing process described herein may include measuring, by a receiver of the base station emulator 140, transmitter antenna patterns of the user equipment 194 as a device under test for different positions of the user equipment 194 as a device under test as measured transmitter antenna patterns of the device under test.

The test controller 170 in FIG. 1A is a test control computer and includes a memory 173, a processor 172, and a user interface 171. The memory 173 may store, for example, instructions that are executable by the processor 172. The processor 172 may retrieve and execute instructions from the memory 173 in accordance with settings and instructions received from a user via the user interface 171. The test controller 170 is a test control machine with control interfaces to all the components of the test system 100 in FIG. 1A, as well as the user equipment 194 and the base station 199. The test controller 170 runs the test software and controls the components of the test system 100 and the user equipment 194 and the base station 199 to do the testing. Accordingly, the test controller 170 is configured to control the anechoic chamber 105, the channel emulator 130, the base station emulator 140, the first RF switch matrix 161, the second RF switch matrix 162, the user equipment 194 and the base station 199. For example, the test controller 170 may implement a method of testing user equipment that includes coordinating the first RF switch matrix 161 to connect the base station emulator 140 to the channel emulator 130 for protocol testing of the user equipment 194, and then coordinating the first RF switch matrix 161 to connect the base station 199 to the channel emulator 130 for performance testing of the user equipment 194.

The test controller 170 is programmed, in part, to configure the bi-directional channel models for the user equipment 194, respectively, including identifying and selecting individual probes of the measurement probes 106 that measure the strongest RF signals from the antennas of the user equipment 194. The test controller 170 also controls measurement functions inside the channel emulator 130, for example, in response to input by a user through the user interface 171. The test controller 170 may set characteristics of additional UE 196, whether emulated UE or additional actual user equipment such as additional mobile wireless equipment in the anechoic chamber 105 or another anechoic chamber. The characteristics may include individual capabilities, number of antennas, corresponding antenna patterns, geography locations, and the like.

As described above, the test controller 170 is a test control computer. In the system of FIG. 1A, the test control computer controls the channel emulator 130, the first RF switch matrix 161, the user equipment 194 in the anechoic chamber 105, the second RF switch matrix 162, the base station emulator 140, and the base station 199 that is connected to the channel emulator 130 via the first RF switch matrix 161 and that is configured to perform performance testing with the user equipment 194 via the channel emulator 130 with fading after the protocol testing is performed without fading. The test control computer also loads the channel emulator 130 with antenna patterns for the base station 199 and for the user equipment 194.

The user equipment 194 may be a mobile wireless device. The user equipment 194 may have a beamforming circuit and may include multiple antennas for receiving and multiple antennas for transmitting, and any of these antennas may be an antenna array of multiple antenna elements such as in a matrix. The user equipment 194 in FIG. 1A supports the downlink antenna measurement function under the RTS method. Further, the testing described herein may be based on an assumption that a radiation pattern of each element of the antennas of the user equipment 194 does not change during the testing, or if there are changes, timing of the changes is known by the test system 100 and the antenna radiation pattern after the change can be measured in the test system 100. The base station 199 may be a 5G base station that includes a massive MIMO antenna. That is, the base station 199 may be configured to simultaneously control a base station antenna with multiple antenna elements grouped in subsets that each form beams radiated in directions different from one another. The base station 199 may also have RF connectors.

In operation, the channel emulator 130 is switched via the first RF switch matrix 161 to connect to the base station emulator 140 for protocol testing of the user equipment 194, and then to connect to the base station 199 for performance testing of the user equipment 194. The channel emulator 130 connects the base station emulator 140 and the base station 199 to the measurement probes 106 in the anechoic chamber 105. If the largest number of transmitter antennas or receiver antennas of the user equipment 194 is M and the number of RF connectors of the base station 199 is N (M and N are natural numbers greater than 1), the channel emulator 130 is capable of supporting bi-directional channel emulation in up to N×M channels. In embodiments, the device under test (the user equipment 194) includes M antennas, where M is a natural number greater than 1 For example, the transmitter antennas and/or receiver antennas of the user equipment 194 may equal M in number, such that the device under test comprises M antennas. In embodiments, the base station 199 includes N radio frequency ports (RF ports).

The base station emulator 140 measures the antenna pattern of the user equipment 194 and the radiation channel matrix H between the measurement probes 106 and the user equipment 194. The results of the measuring are measured antennas patterns of the device under test (the user equipment 194) and a measured radiation channel matrix H between the probes in the anechoic chamber 105 and antennas of the device under test (the user equipment 194). The measured antenna pattern of the user equipment 194 is then emulated in the channel emulator 130, and the inversion of the radiation channel matrix H is applied in the channel emulator 130. The inversion of the radiation channel matrix H is applied in the channel emulator 130 so as to form a wireless cabling connection between the measurement probes 106 and the antennas of the user equipment 194 in the anechoic chamber 105. A wireless cabling connection is an electrical coupling such as on a one-to-one basis between individual probes of the measurement probes 106 and individual antennas or multiple antenna elements of the user equipment 194. Applying the inversion of the radiation channel matrix H in the channel emulator 130 provides for electrically coupling the measurement probes 106 and the antennas of the user equipment 194 effectively as if they were connected by an efficient cable.

The channel emulator 130 in FIG. 1A may include one or more blocks which respectively correspond to software or programming functions. For example, the channel emulator 130 may include an inversion matrix block (i.e., for generating the inversion matrix of the radiation channel matrix H), a channel emulation block, and a beam test block. In an embodiment, the channel emulator 130 may be a processing device or multiple processing devices programmed to implement the functions described herein. For example, the channel emulator 130 may be implemented using one or more processors, such as a computer processor, application specific integrated circuits (ASICs), field-programmable gate arrays (FPGAs), or combinations thereof, using software, firmware, hard-wired logic circuits, or combinations thereof. A computer processor(s) may be constructed of any combination of hardware, firmware and/or software architectures, and may include its own memory (e.g., nonvolatile memory) for storing executable software/firmware executable code that allows it to perform the various functions. In an embodiment, the computer processor may include a central processing unit (CPU), for example, executing an operating system. Also, in an embodiment, the functionality of the channel emulator 130 may be implemented as a computer program or computer software and/or instructions executable by a separate computing device, such as a computer work station or a personal computer (PC).

The channel emulator 130 implements bi-directional channel models of channels between the user equipment 194 and the base station 199 or base station emulator 140, by jointly emulating the antenna patterns and the channels. To do this, the channel emulator 130 is configured to receive base station antenna patterns from the base station emulator 140 and from the base station 199, and to receive the measured user equipment antenna patterns and the radiation channel matrix H from the base station emulator 140. The channel emulator 130 is configured to provide the inversion of the radiation channel matrix H in order to form the wireless cabling connection when implementing a bi-directional channel model.

The channel emulator 130 jointly emulates the measured antenna patterns of the user equipment 194 and the bi-directional channel models, to provide bi-directional spatial channel emulation for the user equipment 194. The joint emulation, which is performed entirely by the channel emulator 130, avoids spatial emulation inside the anechoic chamber 105, and enables measurement by the channel emulator 130 of beam dynamics of the antennas. The channel emulator 130 may perform joint emulation, for example, following a geometry-based channel model, such as 3GPP spatial channel modeling. The channel emulator 130 is connected to the N radio frequency ports (RF ports) of the base station 199 via RF cables, and the antenna array affect of the base station 199 is emulated in the channel emulator 130 by loading the antenna patterns for the transmitter and receiver side. In this way, the effects of the massive MIMO antenna of the base station 199 are emulated bi-directionally in the channel emulator 130.

Performing the joint emulation within the channel emulator 130 greatly simplifies requirements on the anechoic chamber 105 and can support any kind of channel model with the same channel emulator hardware platform. As the beamforming effects of the user equipment 194 are emulated in the channel emulator 130, embedded measurement functionalities may be implemented by the channel emulator 130 to evaluate the beamforming dynamics performance of the user equipment 194. The test system 100 may assume that each individual antenna pattern of the antennas of the user equipment 194 can be measured.

The base station emulator 140 has up to N RF ports, where N is the number of RF ports of the base station 199 being emulated. The base station emulator 140 is used during protocol testing to measure beam dynamics of the user equipment 194. The measured beam dynamics may include the antenna patterns of the user equipment 194 as well as the radiation channel matrix H between the measurement probes 106 and the antennas of the user equipment 194.

The channel emulator 130 and the test controller 170 of the test system 100 are connected to the base station 199. Notably, since the base station 199 is not in the anechoic chamber 105, the anechoic chamber 105 does not have to be a far-field chamber for the base station 199 and does not require a large probe wall to support the channel emulation described herein. That is, in the embodiment of FIG. 1A, a customer testing their user equipment 194 as a DUT is provided an ability to use the base station 199 to test radiation performance of the user equipment 194 under dynamic beamforming and under different channel scenarios in a laboratory environment. The base station 199 is configured to use a massive MIMO antenna in operation and may include the massive MIMO antenna in the testing by the test system 100 of FIG. 1A. In the test system 100 in FIG. 1A, the antenna radiation pattern of the base station 199 is available, such as from either simulated antenna patterns or from measured antenna pattern of the antenna array of the base station 199. When the base station 199 is connected to the channel emulator 130, the base station 199 and the user equipment 194 will then establish a connection and perform the end-to-end testing of the user equipment 194 under dynamic beamforming as the channel in the channel emulator 130 is changed.

The first RF switch matrix 161 may be implemented as a switch multiplexer and may connect the base station emulator 140 to the channel emulator 130 for protocol testing of the user equipment 194. The first RF switch matrix 161 then connects the base station 199 to the channel emulator 130 for the performance testing of the user equipment 194. The first RF switch matrix 161 may switch between the base station emulator 140 and the base station 199 based on an instruction from the test controller 170. The first RF switch matrix 161 selectively connects up to N ports of base station 199 or base station emulator 149 to the channel emulator 130.

The second RF switch matrix 162 may be implemented as a switch multiplexer and may connect the channel emulator 130 to the anechoic chamber 105. More particularly, the second RF switch matrix 162 may connect the channel emulator 130 to selected individual probes of the measurement probes 106. The second RF switch matrix 162 may switch which measurement probes 106 are connected to the channel emulator 130 based on an instruction from the test controller 170. That is, in operation the second RF switch matrix 162 may be controlled to connect the channel emulator 130 to another set of measurement probes of the measurement probes 106.

In the embodiment of FIG. 1A, antenna pattern measurement and report messages 195 are provided from the user equipment 194 to the base station emulator 140, such as during protocol testing. The user equipment antenna pattern measurement and report messages 195 may be provided directly from the user equipment 194 to the base station emulator 140 such as by an RF cable, or indirectly via the test controller 170. The base station emulator 140 also obtains user equipment antenna pattern(s) 136 by measuring the RF signals received from the user equipment 194, such that the user equipment antenna pattern(s) 136 represent information of user equipment antenna patterns detected by the base station emulator 140. The base station emulator 140 also generates information of base station antenna patterns as BS antenna pattern(s) 135. The BS antenna pattern(s) 135 and user equipment antenna pattern(s) 136 are both provided to the channel emulator 130. The BS antenna pattern(s) 135 may also be provided to the channel emulator 130 by the base station 199 during performance testing, in addition to by the base station emulator 140 during protocol testing. The user equipment antenna patterns may also be measured inside a radiated two-stage OTA test system via the user equipment antenna pattern measurement and report messages 195 functionality, or the user equipment antenna patterns may be simulated using electro-magnetic simulation software, for example.

In an embodiment, the user equipment 194 in FIG. 1A is mounted on a multi-dimensional positioner (or rotator) that is configured to dynamically position the user equipment 194 in three dimensions to enable measurement of antenna patterns of the antennas of the user equipment 194, respectively. The orientation of the multi-dimensional positioner may be controlled by the test controller 170, for example, or by a separate controller (not shown) dedicated to positioning of the user equipment 194.

In FIG. 1A, additional UE 196 represent the possibility of adding additional user equipment or user equipment emulators to testing performed by the test system 100, to ensure that the testing of the user equipment 194 reflects the environment of a 5G network in which the user equipment 194 will be operated. The test system 100 may be configured to add the additional UE 196 to test how the user equipment 194 will perform while the additional UE 196 communicate with the base station 199. The additional UE 196 may be either inside the anechoic chamber 105 with the user equipment 194 or connected to the channel emulator 130 such as by RF connections. The additional UE 196 can extend the setup of the test system 100 to support the test of user equipment 194 when other user equipment is connected to the base station 199. In an embodiment, additional user equipment emulators are connected to the channel emulator 130. In another embodiment, another anechoic chamber with the other user equipment inside is connected to the channel emulator 130 along with anechoic chamber 105.

Figure 1B:
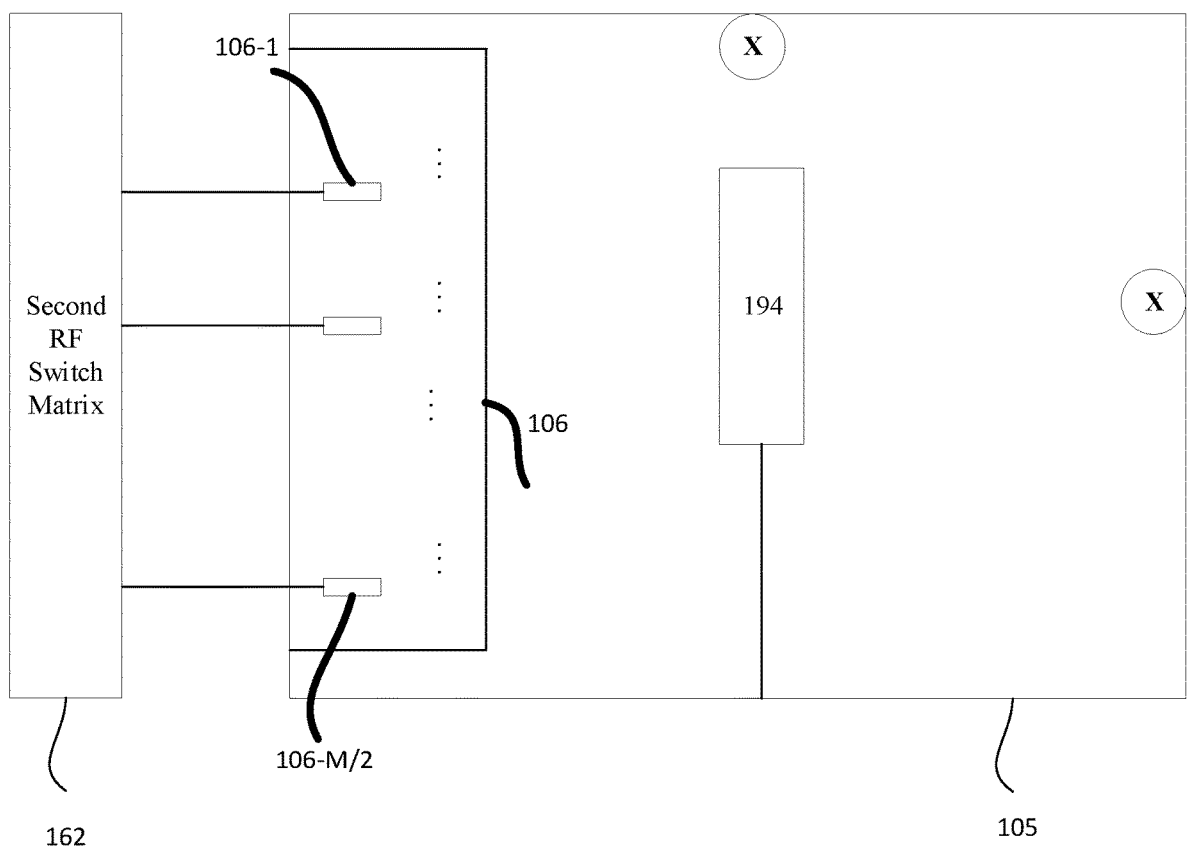
FIG. 1B is an expanded block diagram of the anechoic chamber in the test system of FIG. 1A, according to representative embodiments.

FIG. 1B is an expanded block diagram of the anechoic chamber 105 in the test system of FIG. 1A, according to representative embodiments.

In FIG. 1B, the anechoic chamber 105 includes the measurement probes 106, including measurement probe 106-1 to measurement probe 106-M/2. The user equipment 194 is located in the anechoic chamber 105 with the measurement probes 106, and the measurement probes 106 are positioned in a far field of the antennas of the user equipment 194. The measurement probes 106 for receiving and measuring RF signals from (and transmitting RF signals to) the user equipment 194 may include bi-polarized probes. The number of bi-polarized probes in the measurement probes 106 may be one half (or more) of the number of antennas of the user equipment 194. As an example, if the user equipment 194 has four antennas, the measurement probes 106 may include two or more bi-polarized probes. As another example, if the user equipment 194 has eight antennas, the measurement probes may include four or more bi-polarized probes. The measurement probes 106 may be low reflection and low intrusive to the field of the antennas of the user equipment 194 being measured, such that a very small amount of power is coupled out.

In the depicted embodiment, the second RF switch matrix 162 may be configured to selectively connect the measurement probes 106 to the channel emulator 130. Operation of the second RF switch matrix 162 may be performed by the test controller 170. The user equipment 194 may report to the test controller 170, for example, received signal strength for each of the antennas of the user equipment 194.

In an embodiment, RF signals to and/or from antennas (e.g., multiple antenna elements arranged in an antenna array) of the user equipment 194, may be coupled OTA from and/or to RF signals from and/or to the measurement probes 106. That is, a radiation channel H uplink can be coupled between the measurement probes 106 and the antennas of the user equipment 194. A radiation channel H downlink can also be coupled between the measurement probes 106 and the antennas of the user equipment 194. The coupling can be used to form a radiation channel matrix H between the antennas of the user equipment 194 and the measurement probes 106, which can be measured by the base station emulator 140

The radiation channel matrix H may associate the antennas of the user equipment 194 and the corresponding individual probes of the measurement probes 106. Thus, ultimately, each of the antennas in the user equipment 194 may be associated with an identified one of the measurement probes 106 in the measurement probes 106. When the radiation channel matrix H has been determined, the first RF switch matrix 161 selectively connects the identified measurement probes 106 from among the measurement probes 106 to the channel emulator 130, e.g., under control of the test controller 170. The selected measurement probes 106 correspond to the antennas in the user equipment 194, respectively, enabling the channel emulator 130 to provide the bi-directional channel models.

In addition, the selected measurement probes 106 being selectively connected to the channel emulator 130 by the second RF switch matrix 162 may provide a well conditioned radiation channel matrix H for selected measurement probes 106. A well conditioned radiation channel matrix means that the condition number (the maximum magnitude of the eigen value of the channel matrix over the minimum magnitude of the eigen value) of the channel matrix is larger but very close to 1. This also means that the channel matrix is not ill conditioned and is invertible. The radiation channel matrix H is bi-directional, meaning that the radiation channel matrix element between one user equipment antenna and one selected probe is the same for the uplink and for the downlink.

The channel emulator 130 provides an inversion matrix of the radiation channel matrix to achieve wireless cabling connections between the antennas in the user equipment 194 and the individual selected probes of the measurement probes 106 in the measurement probes 106. The inversion matrix is also bi-directional.

The user equipment antenna patterns of the user equipment 194 are loaded into the channel emulator 130 from the user equipment antenna pattern(s) 136, and the base station antenna patterns are loaded into the channel emulator 130 from the BS antenna pattern(s) 135. A bi-directional channel model between the user equipment 194 and the base station 199 is determined by the channel emulator 130 to enable modeling. The bi-directional channel models are based on the loaded measured user equipment antenna patterns, the loaded base station antenna patterns, and the RF signals coupled between the measurement probes 106 and the antennas of the user equipment 194.

In an embodiment, the bi-directional channel models may be dynamic channel models, which incorporate movement of the user equipment 194, which may be moved along predetermined routes, respectively, while being detected at the base station 199. The base station 199 and the user equipment 194 automatically adapt beamforming to follow the movement of the user equipment 194. As a result, measurement of beam dynamics by the base station emulator 140 is enabled. This likewise enables performance OTA end-to-end testing of user equipment 194 under dynamic beamforming. The end-to-end testing includes the corresponding transmitter antennas and receiver antennas of the user equipment 194.

The test system 100 as a whole may provide a number of performance metrics. For example, the test system 100 may provide uplink and downlink throughput with or without interference from other users' interference from the channel emulator 130, and how well the user equipment 194 is able to perform during the users' movements. Such measurement results are collected at system level from the user equipment 194, for example, by the test controller 170. Thus, the measurement results are not limited to the measurements in the base station emulator 140.

The test system 100, according to various embodiments, provides a number of advantages over conventional test systems. For example, the measurement probes 106 and the emulation of the antenna patterns in the channel emulator 130 make the test system 100 capable of testing user equipment beam dynamics, OTA. This enables evaluation of not only baseband RF, but also of user equipment 194 radiation performance impact. As compared to conventional test systems, the test system 100 is cost effective. The test system 100 reduces the required number of channels of the channel emulator 130 by emulating the spatial channel environment inside the channel emulator 130. Indeed, the test system 100 is very flexible, supporting different channel scenarios, because all the spatial channel emulation is done inside the channel emulator 130. This is not feasible for conventional test systems that attempt to perform the spatial channel emulation with both the channel emulator and a multi-probe anechoic chamber (MPAC) environment.

Figure 2:
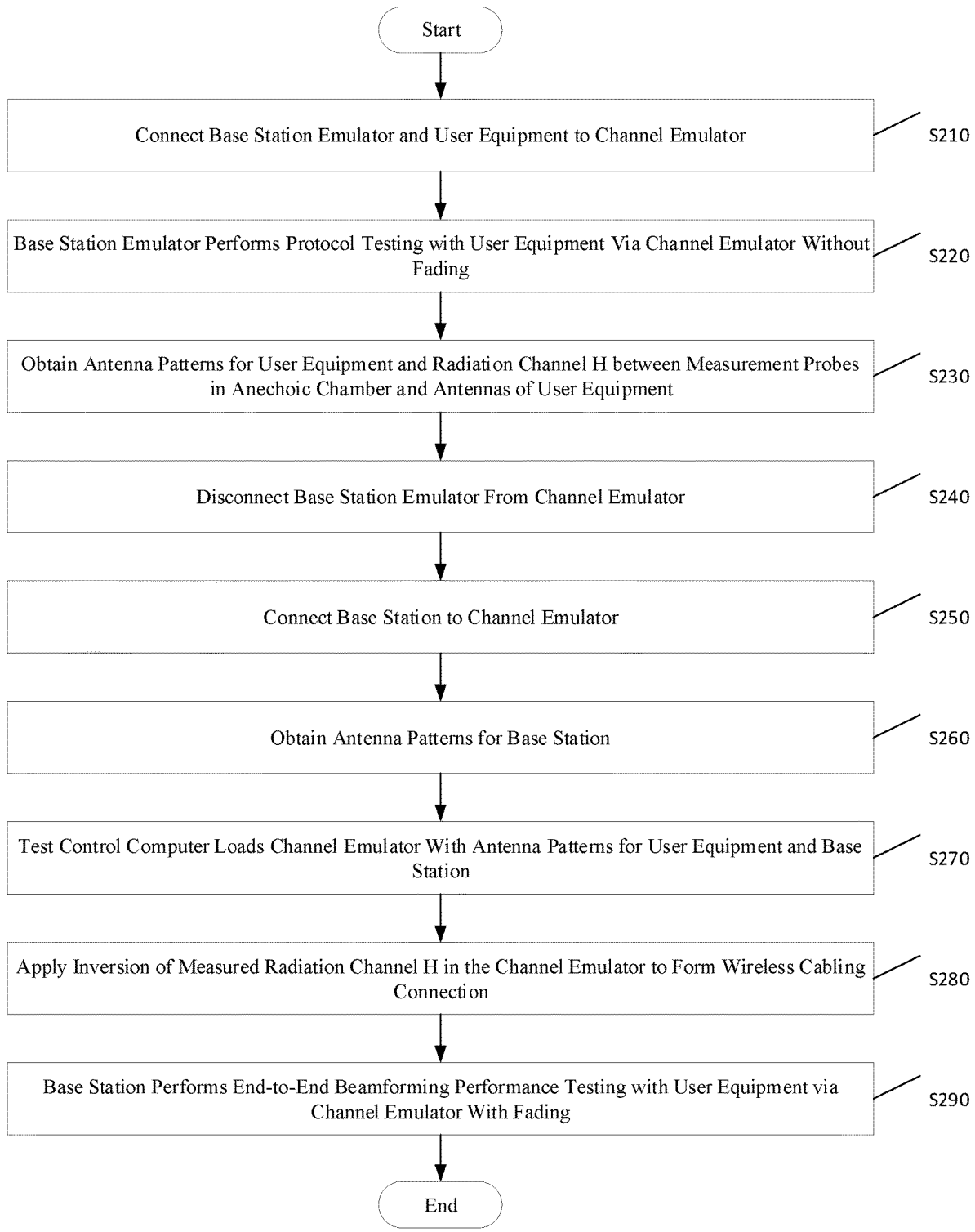
FIG. 2 is a flow diagram showing a method for testing end-to-end performance of user equipment communicating with a base station using dynamic beamforming in the test system of FIG. 1A, according to a representative embodiment.

FIG. 2 is a flow diagram showing a method for testing end-to-end performance of user equipment communicating with a base station using dynamic beamforming in the test system of FIG. 1A, according to a representative embodiment.

In FIG. 2 after the process starts the base station emulator 140 and the user equipment 194 are connected to the channel emulator 130 at S210.

The base station emulator 140 performs the protocol testing with the user equipment 194 via the channel emulator 130 without fading at S220. For example, fading in the channel emulator 130 is turned off, muted or otherwise suppressed for the protocol testing at S220.

Next, at S230 the method of FIG. 2 obtains antenna patterns for the user equipment 194 and the radiation channel matrix H between the measurement probes 106 in the anechoic chamber 105 and the antennas of the user equipment 194 in the anechoic chamber 105. At S230, the antenna patterns for the user equipment and the radiation channel matrix H may be obtained by the base station emulator 140. The antenna patterns for the user equipment 194 may be obtained in whole or in part by self-reporting from the user equipment 194, such as by antenna pattern measurement and report messages 195. The antenna patterns for the user equipment and the radiation channel matrix H may also be obtained by measurements performed by the base station emulator 140.

At S240, the base station emulator 140 is disconnected from the channel emulator 130, and at S250 the base station 199 is connected to the channel emulator 130. The base station 199 is connected for the performance testing of the user equipment 194.

At S260, antenna patterns for the base station 199 are obtained.

At S270, the test controller 170 loads the channel emulator 130 with antenna patterns for the user equipment 194 and the base station 199. The antenna patterns of the user equipment 194 may be determined, for example, from self-reporting by the user equipment 194, by measuring RF signals from the user equipment 194 in the anechoic chamber 105, or by measuring RF signals received by the base station emulator 140, although other techniques for determining the user equipment antenna patterns may be incorporated without departing from the scope of the present teachings.

At S280, the inversion of the measured radiation channel matrix H is applied in the channel emulator 130. Applying the inversion of the measured radiation channel matrix H is performed to form the wireless cabling connection between the measurement probes 106 and the antennas of the user equipment 194 in the anechoic chamber 105.

At S290, the base station 199 performs end-to-end OTA testing of the user equipment 194 under dynamic beamforming via the channel emulator 130, with fading. That is, fading in the channel emulator 130 is turned on for the performance testing involving the base station 199, whereas the fading in the channel emulator 130 was turned off for the protocol testing involving the base station emulator 140.

In FIG. 2, RF signals are coupled to the measurement probes 106 to form a high dimension radiation channel matrix H indicating channels between the antennas of the user equipment 194 and the measurement probes 106. The RF signals may be received from the antennas and/or transmitted to the antennas in the user equipment 194. Coupling the RF signals to the measurement probes 106 may include determining measurement probes 106 of the measurement probes 106 to be associated with the antennas in the user equipment 194, e.g., by the test controller 170.

The measurement probes 106 may be selectively connected to the channel emulator 130 through an RF switch (e.g., the second RF switch matrix 162), for example. Connecting the measurement probes 106 to the channel emulator 130 enables the channel emulator 130 to determine a radiation channel matrix corresponding to coupling channels between antenna elements in the user equipment antenna array and the selected measurement probes 106. Measurement of the radiation channel matrix is performed for both the uplink and downlink, according to any of a variety of techniques, as would be apparent to one skilled in the art. For example, the downlink measurements of the radiation channel matrix may be performed using simple power measurement functionality in the user equipment 194, as described, for example, by Ya Jing et al., U.S. Patent Application Publication No. 2017/0373773 (Dec. 28, 2017), which is hereby incorporated by reference in its entirety. Uplink measurements of the radiation channel matrix may be made utilizing orthogonal pilots in the transmitted signal of the user equipment 194 and/or employing digital, analog and/or hybrid beam forming techniques as described, for example, by "Radiated Power and Phase Calibration of a Multichannel Signal Transmitter," IP.com (Feb. 3, 2017), which is hereby incorporated by reference in its entirety.

The channel emulator 130 and the test controller 170 (e.g., the processor 172), as well as any other component requiring processing capabilities, such as the base station emulator 140, may be implemented using one or more processors, such as a computer processor, ASICs, FPGAs, or combinations thereof, using software, firmware, hard-wired logic circuits, or combinations thereof. A computer processor, in particular, may be constructed of any combination of hardware, firmware or software architectures, and may include its own memory (e.g., nonvolatile memory) for storing executable software/firmware executable code that allows it to perform the various functions. Also, in an embodiment, the functionality of the test controller 170 and/or the channel emulator 130 may be implemented as a computer program or computer software and/or instructions executable by a separate computing device, such as a computer work station or a PC, without departing from the scope of the present teachings. All or a portion of the steps indicated in FIG. 2 may be executed by the test controller 170 and/or the channel emulator 130.

One or more memories (e.g., memory 173) as well as memories used to store the BS antenna pattern(s) 135 and user equipment antenna pattern(s) 136 may be further provided in order to store software and/or programs executable by the processor (e.g., processor 172), as well as data, such as data collected from the measurement probes 106 110, the user equipment 194, the channel emulator 130 and/or the additional UE 196, as well as other sources of information. The memories may be implemented by any number, type and combination of random access memory (RAM) and read-only memory (ROM), for example, and may store various types of information, such as computer programs and software algorithms executable by the one or more processors (and/or other components), as well as raw data and/or testing and measurement data storage, for example. The various types of ROM and RAM may include any number, type and combination of computer readable storage media, such as a disk drive, an electrically programmable read-only memory (EPROM), an electrically erasable and programmable read only memory (EEPROM), a CD, a DVD, a universal serial bus (USB) drive, and the like, which are tangible and non-transitory storage media (e.g., as compared to transitory propagating signals).

Figure 3A:
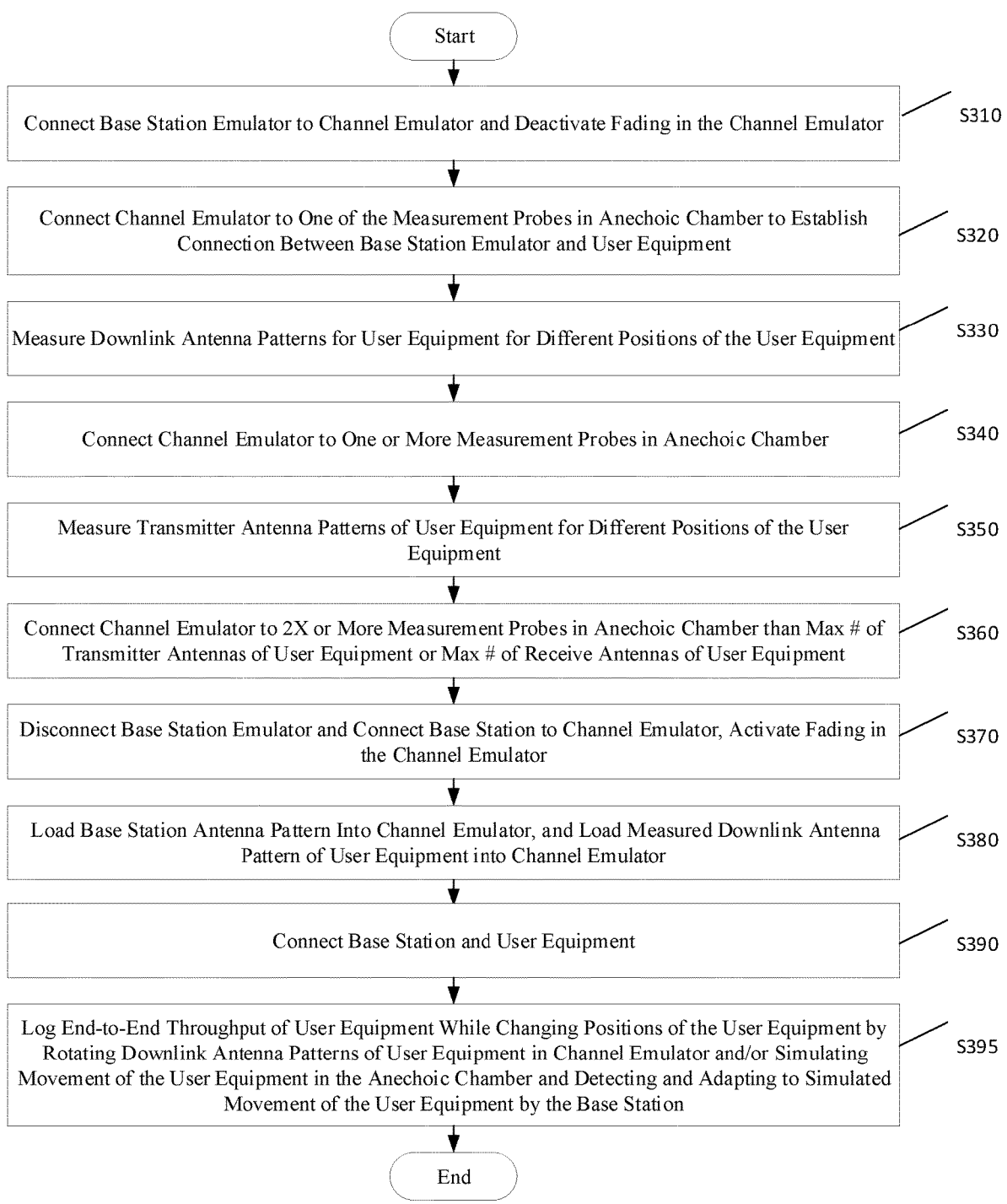
FIG. 3A is a flow diagram showing a method for testing end-to-end performance of user equipment communicating with a base station using dynamic beamforming, according to a representative embodiment.

FIG. 3A is a flow diagram showing a method for testing end-to-end performance of user equipment communicating with a base station using dynamic beamforming, according to a representative embodiment.

At S310, the base station emulator is connected to a channel emulator, and fading is deactivated in the channel emulator. For example, a first radio frequency switch matrix is set to connect the base station emulator and the channel emulator, and the fading is turned off.

At S320, the channel emulator is connected to one of the measurement probes in the anechoic chamber to establish the connection between the base station emulator and the user equipment. For example, a second radio frequency switch matrix is set to connect one or more measurement probes.

At S330, downlink antenna patterns for the user equipment are measured for different positions of the user equipment. That is, at S330 the method of FIG. 3A includes measuring downlink antenna patterns of the device under test for different positions of the device under test as measured downlink antenna patterns of the device under test. For example, user equipment antenna measure and report messages may be used to measure the user equipment downlink antenna patterns. The three-dimensional (3D) pattern can be obtained by performing this measuring at S330 for different positions of the user equipment.

At S340, the channel emulator is connected to one or more measurement probes in the anechoic chamber. For example, the second radio frequency switch matrix can be set to connect to one or more measurement probes in the anechoic chamber. In one embodiment, the number of measurement probes used is greater than the number of transmitter antennas of the user equipment. For example, the number of measurement probes may be two or more times than the number of transmitter antennas of the user equipment. Several different possibilities exist for the transmitter pattern measurement in different embodiments. For example, if time division duplex (TDD) is being used by the transmitter antennas, the downlink antenna pattern measurement results can be used directly along with reciprocity of the antenna pattern, though gain may require calibration in this instance. In another embodiment, the transmitter antenna pattern can be measured with a single probe by using the orthogonal pilot signal, in which case the single probe will suffice.

At S350, transmitter antenna patterns of the user equipment are measured for different positions of the user equipment. That is, at S350 the method of FIG. 3A includes measuring transmitter antenna patterns of the device under test for different positions of the device under test as measured transmitter antenna patterns of the device under test. For example, the base station emulator may measure the antenna patterns of the user equipment based on received RF signals. For example, orthogonal pilot signals from transmit antennas of the user equipment may be measured by the base station emulator for each channel. That is, the measuring of the transmitter antenna patterns of the device under test may be performed based on orthogonal pilot signals of the device under test transmitter signals for each channel. The three-dimensional antenna pattern can be obtained by performing the measuring at S350 for multiple different positions of the user equipment in the anechoic chamber.

At S360, the channel emulator is connected to more measurement probes in the anechoic chamber. The number of measurement probes may be two or more times than the maximum number of transmitter antennas of the user equipment or than the maximum number of receive antennas of the user equipment. The measurement probes connected to the channel emulator at S360 may be an entirely new set of measurement probes compared to the measurement probe(s) connected at S340.

At S360, the second radio frequency switch matrix may be set to connect to a new set of measurement probes in the anechoic chamber, and the downlink radiation channel for the downlink and also the uplink radiation channel for the uplink are measured separately. The two radiation channel matrices can be compared to predetermined criteria, and if both of the two radiation channel matrices satisfy the predetermined criteria, the process can proceed to S370. Otherwise, the second radio frequency switch matrix can be controlled to connect to another set of measurement probes, or the position of the user equipment can be changed. That is, block S360 may include controlling the second radio frequency switch matrix to connect to another set of measurement probes, or otherwise changing the position of the user equipment in the anechoic chamber. The two radiation channel matrices can be measured until both meet the predetermined criteria. That is, process at block S360 may be repeated until both of the two radiation channel matrices satisfy the predetermined criteria, by switching the measurement probes to another set of probes or changing position of the user equipment in the anechoic chamber and then repeating the measurements and comparison.

At S370, the base station emulator is disconnected from the channel emulator, and the base station is connected to the channel emulator. Fading is activated in the channel emulator when the base station is connected. That is, at S370 the first radio frequency switch matrix may connect the base station with the channel emulator.

At S380, the base station antenna pattern is loaded into the channel emulator. The measured downlink antenna pattern of the user equipment is also measured into the channel emulator. The inversions of the two radiation channel matrices are applied in the channel emulator to form the wireless cabling. The channel scenarios to be used are configured, and the fading is activated. That is, at S380, the method of FIG. 3A includes loading a base station antenna pattern into the channel emulator and loading the measured downlink antenna pattern of the device under test into the channel emulator.

At S390, the base station is connected to the user equipment.

At S395, end-to-end throughput of the user equipment is logged while changing positions of the user equipment by rotating downlink antenna patterns of the user equipment in the channel emulator. Alternatively, the user equipment may change positions in simulations by simulating movement of the user equipment in the anechoic chamber and detecting and adapting to the simulated movement of the user equipment by the base station. That is, at S395 the method of FIG. 3A may include detecting, by the base station, simulated movement of the device under test through different positions, and adapting, by the base station, beamforming in response to detecting the simulated movement of the device under test through the different positions.

That is, at S390 and S395, the method of FIG. 3A includes connecting the base station and the device under test and logging end-to-end throughput of the device under test while changing positions of the device under test in the channel emulator.

In FIG. 3A, dynamic channel modes can be configured in the channel simulator in order to test performance of the user equipment in dynamic scenarios. That is, in FIG. 3A, the method may include testing performance of the device under test using dynamic channel models that are configured on the channel emulator and that include emulating movement of the device under test through different positions. For example, the user equipment can be moved along a specified route of a specified type, so as to change testing scenarios dynamically. The changes will be detected by the base station, which in turn will adapt its beamforming automatically along with the user equipment. As a result, performance of the user equipment in the scenarios can be dynamically tested.

Figure 3B:
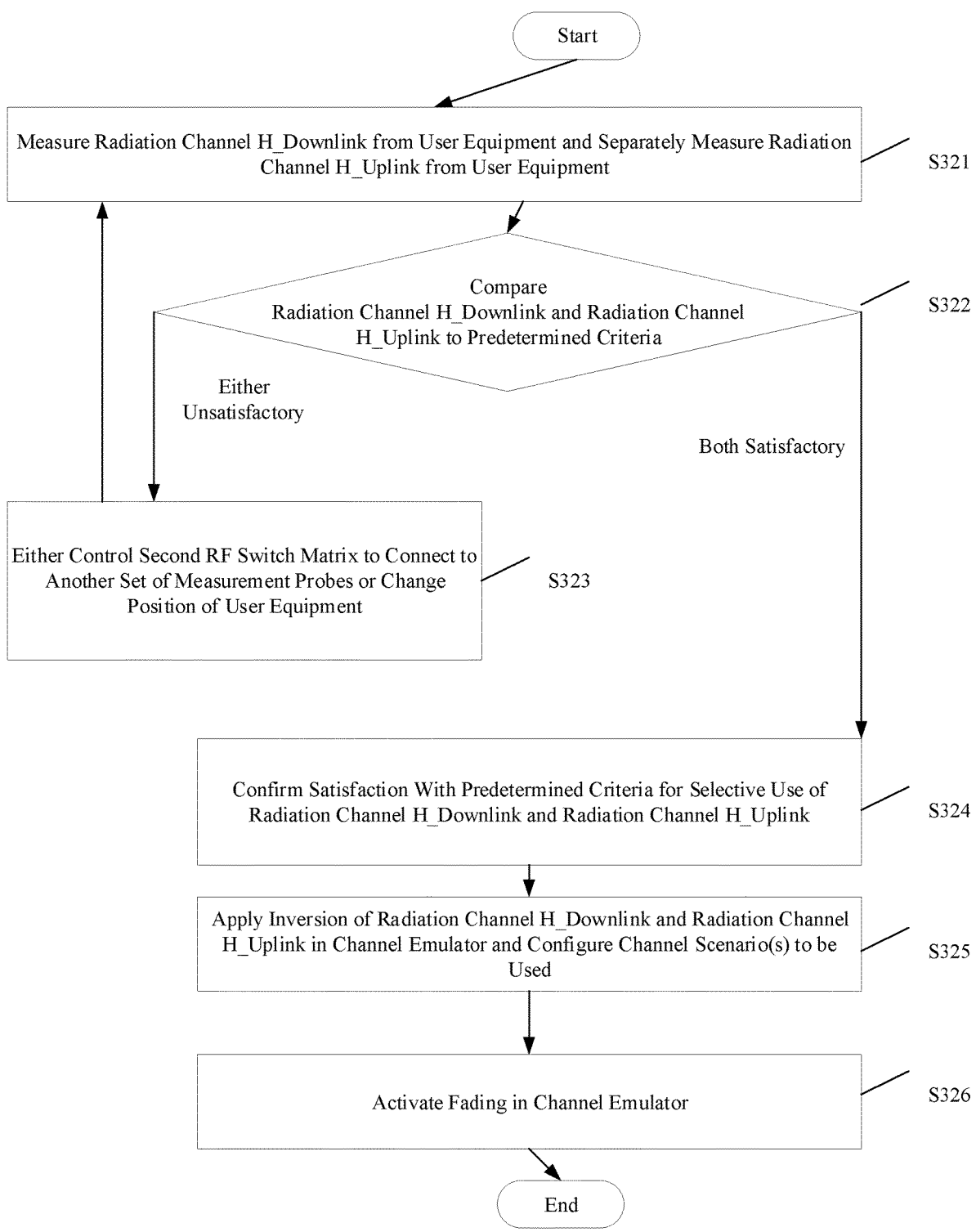
FIG. 3B is a flow diagram showing a method for protocol testing in the method of FIG. 3A, according to a representative embodiment.

FIG. 3B is a flow diagram showing a method for protocol testing in the method of FIG. 3A, according to a representative embodiment.

At S321, the radiation channel matrix H for the downlink is measured from the user equipment. Separately, the radiation channel matrix H for the uplink is measured for the user equipment.

At S322, the radiation channel matrix H for the downlink and the radiation channel matrix H for the uplink are compared to predetermined criteria. That is, the method of 3A includes comparing the radiation channel matrix H for the downlink and the radiation channel matrix H for the uplink to predetermined criteria at S322.

If either of the radiation channels are unsatisfactory (S322=Either Unsatisfactory), either the second RF switch matrix is controlled to connect to another set of measurement probes or the position of the user equipment is changed at S323. Afterwards, the process returns to S321 to again measure the radiation channels for the downlink and the uplink for the user equipment.

If both radiation channels measured at S321 are satisfactory (S322=Both Satisfactory), then at S324 satisfaction with the predetermined criteria is confirmed at S324. Therefore, the radiation channels measured at S321 are selectively used in the process at S324, based on the comparison at S322.

At S325, an inversion of the radiation channel matrix H for the downlink is applied in the channel emulator. The inversion of the radiation channel matrix H for the uplink is also applied in the channel emulator. The channel scenarios to be used are also configured in the channel emulator. That is, at S325, the method of FIG. 3B includes applying an inversion of the radiation channel matrix for the downlink and the inversion of the radiation channel matrix for the uplink in the channel emulator. Here the method also includes configuring channel scenarios to be used before activating the fading in the channel emulator.

At S326, fading is activated in the channel emulator, so that the end-to-end performance of the user equipment in communications with the base station can be logged.

In the method of FIG. 3B, the protocol testing of the user equipment is performed from S321 to S322 while fading is turned off in the channel emulator. This may accommodate the difficulty or inability some base station emulators have with handling fading, while also setting up the end-to-end testing to be performed by the base station as at S390 and S395. In an embodiment, the base station emulator may even be necessary for protocol testing, when a base station is not equipped for the protocol testing described herein.

Figure 4:
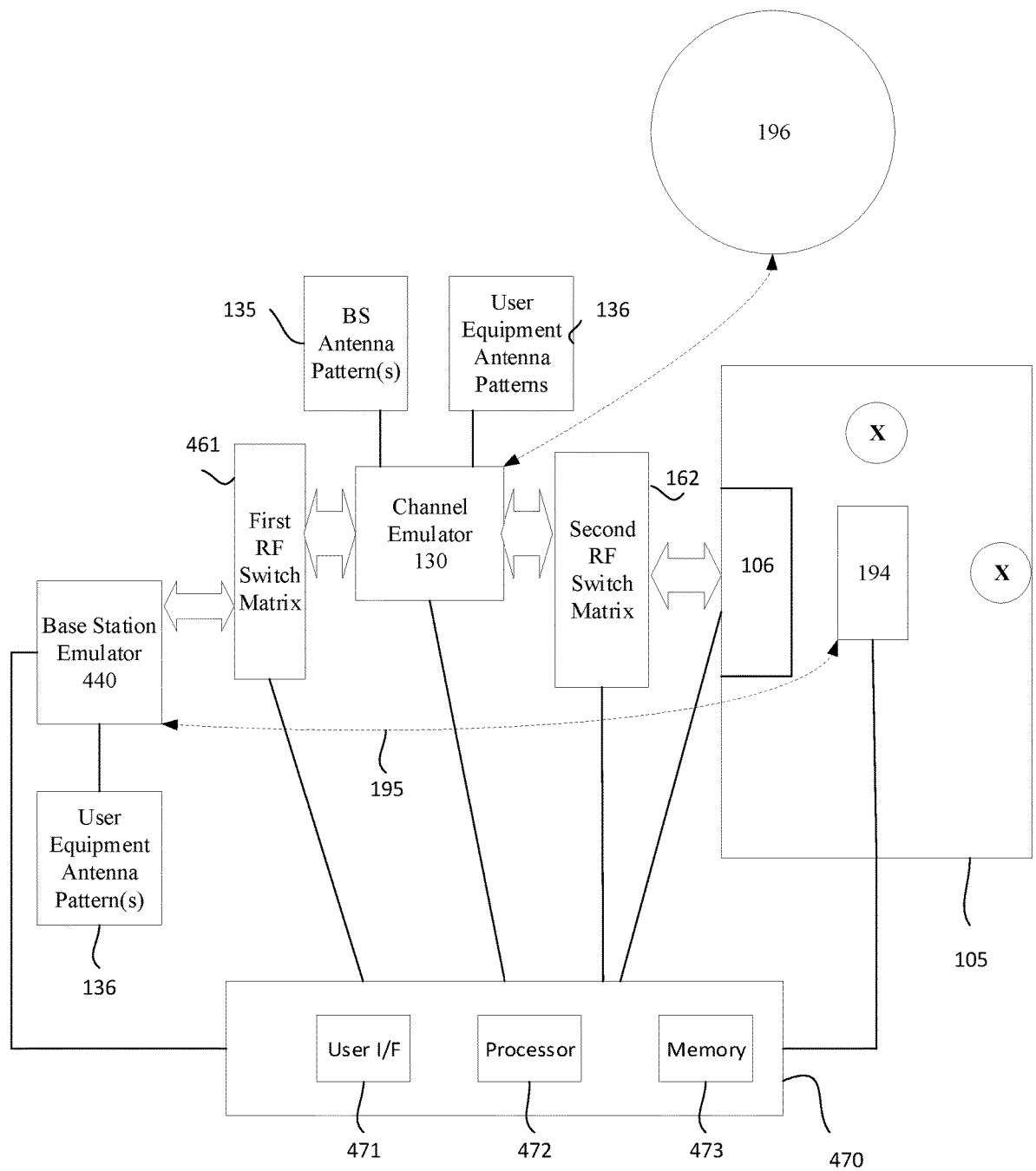
FIG. 4 is a simplified block diagram of another test system for performing OTA testing of user equipment within an anechoic chamber, according to representative embodiments.

FIG. 4 is a simplified block diagram of another test system for performing OTA testing of user equipment within an anechoic chamber, according to representative embodiments.

In the embodiment of FIG. 4, the base station emulator 440 performs both the protocol testing and the performance testing of the user equipment 194. That is, the base station emulator 440 is configured to perform end-to-end testing even while fading is activated in the channel emulator 130. The test computer 470 is configured to control the base station emulator 440 to perform the testing without requiring the base station 199 from FIG. 1A.

Figure 5:
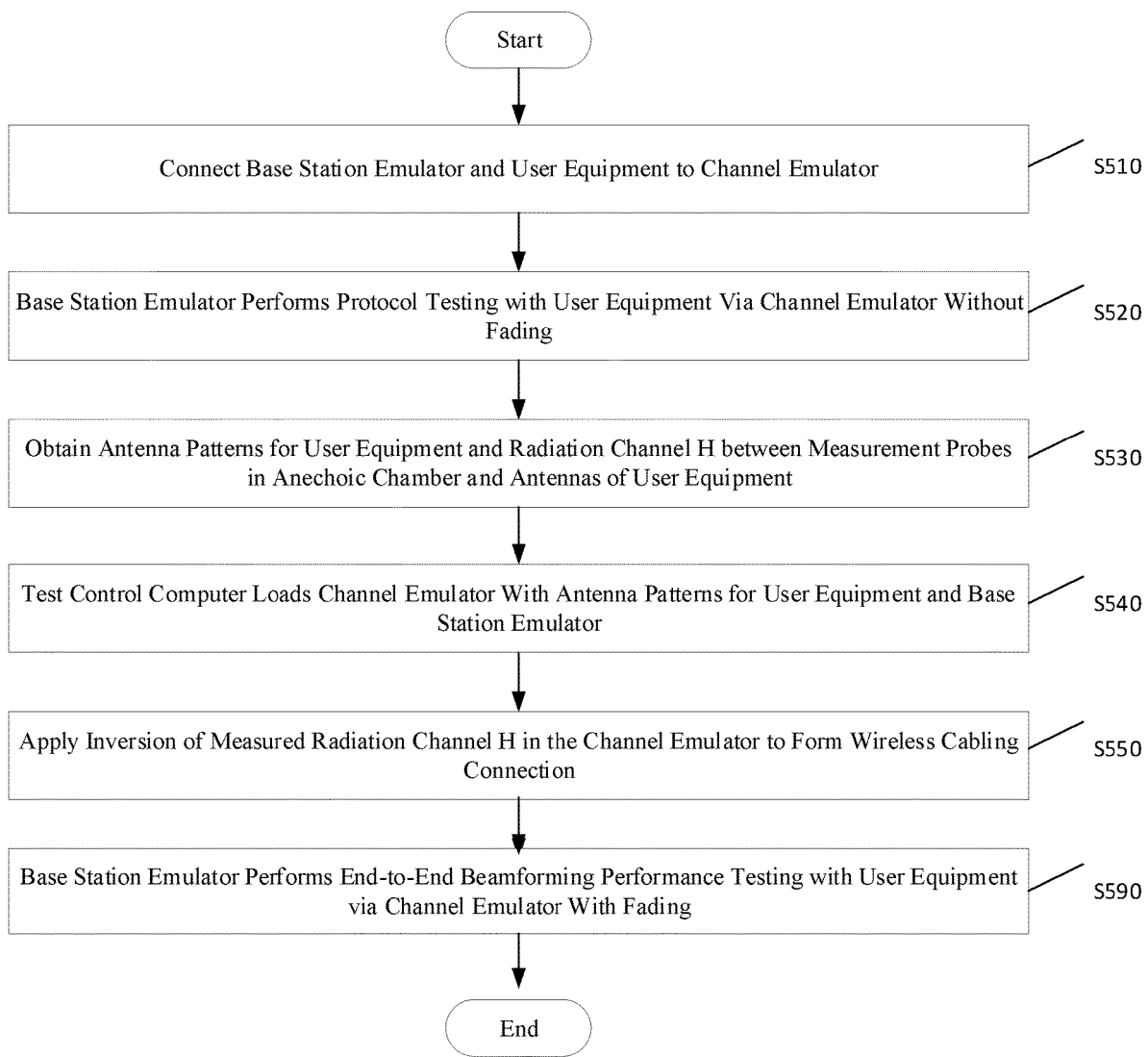
FIG. 5 is a flow diagram showing a method for testing end-to-end performance of user equipment communicating with a base station using dynamic beamforming in the test system of FIG. 4, according to a representative embodiment.

FIG. 5 is a flow diagram showing a method for testing end-to-end performance of user equipment communicating with a base station using dynamic beamforming in the test system of FIG. 4, according to a representative embodiment.

In the embodiment of FIG. 5, the base station emulator 440 and the user equipment 194 are connected to the channel emulator at S510.

At S520, the base station emulator 440 performs protocol testing with the user equipment 194 via the channel emulator without fading.

At S530, antenna patterns for the user equipment 194 are obtained along with the radiation channel matrix H between the measurement probes 106 in the anechoic chamber 105 and the antennas of the user equipment 194.

At S540, the test controller 170 loads the channel emulator 430 with antenna patterns for the user equipment 194 and for the base station emulator 440.

At S550, an inversion of the measured radiation channel matrix H is applied in the channel emulator 430. As a result, a wireless cabling connection is formed between the measurement probes 106 and the antennas of the user equipment 194.

At S590, the base station emulator 440 performs end-to-end beamforming performance testing with the user equipment 194 via the channel emulator 430 with fading.

The various components, structures, parameters and methods are included by way of illustration and example only and not in any limiting sense. In view of this disclosure, those skilled in the art can implement the present teachings in determining their own applications and needed components, materials, structures and equipment to implement these applications, while remaining within the scope of the appended claims.

For example, compared to the test system 100 of FIG. 1A, if the base station 199 implements the required measurement functions of the base station emulator 140 and can open the measurement functionality for the testing, then the base station emulator 140 can be removed. On the other hand, if the base station emulator 140 has the capabilities to emulate the massive MIMO beamforming functionalities of the base station 199 as well as the uplink faded signal processing, the base station emulator 140 can be used to test the user equipment end to end performance under dynamic beamforming without using the base station 199. Embodiments showing the latter configuration are illustrated in and described with respect to FIG. 4 and FIG. 5 above.

What is claimed:

1. A test system for testing an antenna of a device under test (DUT), the test system comprising:
   a channel emulator configured to support bi-directional channel emulation and configured to emulate wireless channel conditions with fading and without fading in channels of the channel emulator;
   a first radio frequency switch matrix;
   an anechoic chamber connected to the channel emulator via the first radio frequency switch matrix, and containing a plurality of probes and user equipment as a device under test;
   a second radio frequency switch matrix;
   a base station emulator connected to the channel emulator via the second radio frequency switch matrix and configured to perform protocol testing with the device under test via the channel emulator without fading; and
   a test control computer comprising a memory that stores instructions and a processor that executes the instructions, wherein the test control computer controls the channel emulator, the first radio frequency switch matrix, the device under test in the anechoic chamber, the second radio frequency switch matrix, the base station emulator, and a base station that is connected to the channel emulator via the first radio frequency switch matrix and that is configured to perform performance testing with the device under test via the channel emulator with fading after the protocol testing is performed without fading;
   wherein the test control computer loads the channel emulator with antenna patterns for the base station and for the device under test,
   the channel emulator provides bi-directional channel emulation between the base station and the device under test in the anechoic chamber and emulates transmitter antenna effects and receive antenna effects of the device under test by loading the antenna patterns such that a wireless cabling connection between the channel emulator and antennas of the device under test is formed, and
   after the wireless cabling connection is formed with the antennas of the device under test, the base station and the device under test establish a connection and perform end-to-end testing under dynamic beamforming as the channels of the channel emulator are changed.

2. The test system of claim 1,
   wherein the base station emulator measures the antenna patterns of the device under test as measured antenna patterns of the device under test along with a radiation channel matrix H between the probes in the anechoic chamber and antennas of the device under test as a measured radiation channel matrix H,
   the measured antenna patterns of the device under test are emulated in the channel emulator,
   an inversion of the measured radiation channel matrix H is applied in the channel emulator to form the wireless cabling connection,
   the base station comprises N radio frequency ports, where N is a natural number greater than 1,
   the device under test comprises M antennas, where M is a natural number greater than 1, and
   the channel emulator is configured to support bi-directional channel emulation in up to N×M channels.

3. The test system of claim 1, further comprising:
   the base station, wherein the base station is configured to simultaneously control a base station antenna with a plurality of antenna elements grouped in subsets that each form beams radiated in directions different from one another.

4. A method of testing user equipment as a device under test (DUT) in a test system comprising a channel emulator configured to connect to a base station emulator and a base station through a first radio frequency switch matrix and to connect to a plurality of probes in an anechoic chamber through a second radio frequency switch matrix, the method comprising:
   connecting the base station emulator to the channel emulator via the first radio frequency switch matrix, and deactivating fading in the channel emulator;
   connecting the channel emulator to one of the plurality of probes in the anechoic chamber via the second radio frequency switch matrix to establish a connection between the base station emulator and a user equipment as a device under test in the anechoic chamber;
   measuring downlink antenna patterns of the device under test for different positions of the device under test as measured downlink antenna patterns of the device under test;
   connecting, via the second radio frequency switch matrix, the channel emulator to a number of the plurality of probes that is two or more times a number of transmitter antennas on the device under test;
measuring, by a receiver of the base station emulator, transmitter antenna patterns of the device under test for different positions of the device under test as measured transmitter antenna patterns of the device under test;
connecting, via the second radio frequency switch matrix, the channel emulator to a new set of the plurality of probes that is two or more times a maximum number of transmitter antennas of the device under test or a maximum number of receive antennas of the device under test;
connecting the base station to the channel emulator via the first radio frequency switch matrix, activating fading in the channel emulator, loading a base station antenna pattern into the channel emulator, and loading the measured downlink antenna patterns of the device under test into the channel emulator; and
connecting the base station and the device under test and logging end-to-end throughput of the device under test while changing positions of the device under test in the channel emulator by rotating the downlink antenna patterns of the device under test.

5. The method of claim 4, further comprising:
measuring a radiation channel matrix for a downlink from the device under test and separately measuring a radiation channel matrix for an uplink from the device under test;
selectively using the radiation channel matrix for the downlink and the radiation channel matrix for the uplink based on determining that the radiation channel matrix for the downlink and the radiation channel matrix for the uplink satisfy predetermined criteria, and
applying an inversion of the radiation channel matrix for the downlink and an inversion of the radiation channel matrix for the uplink in the channel emulator and configuring channel scenarios to be used before activating the fading in the channel emulator.

6. The method of claim 5,
wherein the selectively using the radiation channel matrix for the downlink and the radiation channel matrix for the uplink comprises comparing the radiation channel matrix for the downlink and the radiation channel matrix for the uplink to the predetermined criteria, and when one or both of the radiation channel matrix for the downlink and the radiation channel matrix for the uplink are unsatisfactory, then either controlling the second radio frequency switch matrix to connect to another set of probes or changing a position of the device under test, and then repeating the measuring of the radiation channel matrix for the downlink for the downlink from the device under test and separately measuring the radiation channel matrix for the uplink from the device under test.

7. The method of claim 4,
wherein the measuring of the transmitter antenna patterns of the device under test by the receiver of the base station emulator is performed based on orthogonal pilot signals of the device under test transmitter signals for each channel.

8. The method of claim 4, further comprising:
testing performance of the device under test using dynamic channel models that are configured on the channel emulator and that include emulating movement of the device under test through different positions.

9. The method of claim 8, further comprising:
detecting, by the base station, simulated movement of the device under test through different positions, and
adapting, by the base station, beamforming in response to detecting simulated movement of the device under test through the different positions.

10. A test system for testing an antenna of a device under test (DUT), the test system comprising:
a channel emulator configured to support bi-directional channel emulation and configured to emulate wireless channel conditions with fading and without fading in channels of the channel emulator;
a first radio frequency switch matrix;
an anechoic chamber connected to the channel emulator via the first radio frequency switch matrix, and containing a plurality of probes and user equipment as a device under test;
a second radio frequency switch matrix;
a base station emulator connected to the channel emulator via the second radio frequency switch matrix and configured to perform protocol testing with the device under test via the channel emulator, and performance testing with the device under test via the channel emulator with fading after the protocol testing is performed; and
a test control computer comprising a memory that stores instructions and a processor that executes the instructions, wherein the test control computer controls the channel emulator, the first radio frequency switch matrix, the device under test in the anechoic chamber, the second radio frequency switch matrix, and the base station emulator;
wherein the test control computer loads the channel emulator with antenna patterns for the base station emulator and for the device under test,
the channel emulator provides bi-directional channel emulation between the base station emulator and the device under test in the anechoic chamber and emulates transmitter antenna effects and receive antenna effects of the device under test by loading the antenna patterns such that a wireless cabling connection between the channel emulator and the antennas of the device under test is formed, and
after the wireless cabling connection is formed with the antennas of the device under test, the base station emulator and the device under test establish a connection and perform end-to-end testing under dynamic beamforming as the channels of the channel emulator are changed.

* * * * *